United States Patent
Galindo et al.

(10) Patent No.: US 12,006,493 B2
(45) Date of Patent: Jun. 11, 2024

(54) NITRILE SOLVENTS

(71) Applicant: Ascend Performance Materials Operations LLC, Houston, TX (US)

(72) Inventors: Tanhee Galindo, Katy, TX (US); Zheng Chai, Houston, TX (US); Jefferson Thomas Ebert, Houston, TX (US); Benjamin Haseltine, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 336 days.

(21) Appl. No.: 17/483,736

(22) Filed: Sep. 23, 2021

(65) Prior Publication Data
US 2022/0098526 A1 Mar. 31, 2022

Related U.S. Application Data

(60) Provisional application No. 63/083,390, filed on Sep. 25, 2020.

(51) Int. Cl.
| | | |
|---|---|---|
| *C11D 3/26* | (2006.01) | |
| *C11D 3/28* | (2006.01) | |
| *C11D 7/32* | (2006.01) | |
| *C11D 7/50* | (2006.01) | |

(52) U.S. Cl.
CPC .............. *C11D 7/5013* (2013.01); *C11D 3/26* (2013.01); *C11D 3/28* (2013.01); *C11D 7/32* (2013.01); *C11D 7/3281* (2013.01)

(58) Field of Classification Search
CPC .... C11D 3/26; C11D 3/28; C11D 7/32; C11D 7/3281; B08B 3/08; B08B 3/10
USPC ............... 510/238, 245, 247, 254, 265, 500; 134/39, 40, 42
See application file for complete search history.

(56) References Cited

U.S. PATENT DOCUMENTS

| | | | | |
|---|---|---|---|---|
| 5,531,916 A * | 7/1996 | Merchant | ............... | C09K 5/045 |
| | | | | 134/40 |
| 6,010,997 A * | 1/2000 | Thenappan | ......... | C11D 11/0029 |
| | | | | 134/40 |
| 6,103,684 A * | 8/2000 | Thenappan | ........... | C07C 19/075 |
| | | | | 134/40 |
| 6,365,565 B1 * | 4/2002 | Thenappan | ........... | C07C 19/075 |
| | | | | 134/40 |
| 6,660,701 B1 * | 12/2003 | Degroot | .................... | C11D 7/26 |
| | | | | 510/273 |
| 6,663,841 B2 * | 12/2003 | Salma | ................ | B01D 53/1481 |
| | | | | 423/437.1 |
| 2012/0247515 A1 | 10/2012 | Taylor | | |
| 2013/0118996 A1 * | 5/2013 | Kaplan | ................ | C07D 251/04 |
| | | | | 544/215 |
| 2015/0011453 A1 * | 1/2015 | Bennett | ................ | C11D 3/2006 |
| | | | | 562/67 |
| 2018/0148632 A1 * | 5/2018 | Bennett | .................. | C09K 8/524 |
| 2019/0241843 A1 * | 8/2019 | Shellef | ...................... | C09D 7/20 |
| 2020/0283357 A1 | 9/2020 | Tsuruta et al. | | |
| 2021/0147766 A1 * | 5/2021 | Shellef | ....................... | B08B 3/00 |
| 2023/0183534 A1 * | 6/2023 | Patel | ........................ | C08L 63/00 |
| | | | | 525/515 |

FOREIGN PATENT DOCUMENTS

| | | | | |
|---|---|---|---|---|
| CN | 106381182 A | | 2/2017 | |
| CN | 110573232 A | | 12/2019 | |
| EP | 1016699 A1 | * | 7/2000 | .............. A61K 8/37 |
| WO | 2005/097300 A1 | | 10/2005 | |
| WO | 2008/049188 A1 | | 5/2008 | |
| WO | 2008/124404 A1 | | 10/2008 | |
| WO | 2018/001604 A1 | | 1/2018 | |

OTHER PUBLICATIONS

Bakke et al., "Hydrolysis of 1,3,5-Tris(2-hydroxyethyl)hexahydro-s-triazine and Its Reaction with H2S", Ind. Eng. Chem. Res. 2001, vol. 40, pp. 6051-6054.

Taylor et al., "Gas Chromatographic-Mass Spectrometric Analysis of Chemically Derivatized Hexahydrotriazine-based Hydrogen Sulfide Scavengers: Part II", Ind. Eng. Chem. Res. 2010, vol. 49, pp. 6267-6269.

Taylor et al., "Structural Elucidation of the Solid Byproduct from the Use of 1,3,5-Tris(hydroxyalkyl)hexahydro-s-triazine Based Hydrogen Sulfide Scavengers", Ind. Eng. Chem. Res. 2011, vol. 50, pp. 735-740.

* cited by examiner

*Primary Examiner* — Gregory R Delcotto
(74) *Attorney, Agent, or Firm* — COZEN O'CONNOR

(57) ABSTRACT

A method of removing from a surface a solid sulfur-containing impurity composition comprising a sulfur-containing compound, the method comprising the step of dissolving sulfur-containing compound in the sulfur-containing impurity composition with a nitrile compound to form a treated sulfur-containing impurity composition comprising less than 99.5 wt % sulfur-containing compound, based on the total weight of the treated sulfur-containing impurity composition.

17 Claims, No Drawings

NITRILE SOLVENTS

CROSS-REFERENCE

This application is related to and claims priority to U.S. Provisional Patent Application No. 63/083,390 filed Sep. 25, 2020, which is incorporated herein by reference.

FIELD

The present disclosure relates generally to the use of nitrile compounds as solvents. In particular, the present disclosure relates to the use of nitriles, such as tricyanohexane, as solvents (e.g., dissolving additives) for impurities, e.g., in industrial fluids.

BACKGROUND

Hydrogen sulfide ($H_2S$) and other organic sulfide compounds are commonly associated with various oil and gas operations. For example, hydrogen sulfide is present in small amounts as an impurity in crude petroleum, and natural gas may comprise as much as 30% hydrogen sulfide. Broadly, hydrogen sulfide and other organic sulfide compounds may be present in various fluids associated with various industrial processes, such as oil and gas operations. Because hydrogen sulfide and other organic sulfide compounds are highly corrosive and toxic, it is desirable to reduce or remove the sulfide compounds from industrial fluids. In oil and gas operations, for example, the various processes for reducing or removing sulfide compounds from these fluids are generally referred to as "sweetening" processes.

A common approach to reducing or removing sulfide components utilizes chemical scavengers, typically referred to as "hydrogen sulfide scavengers" or "$H_2S$ scavengers." For example, triazine compounds are commonly used as hydrogen sulfide scavengers. These and other hydrogen sulfide scavengers may be directly injected into various fluid stream in oil and gas operations, including at the well-head, into water-saturated stream, or in gas-liquid contactors at treatment facilities. Hydrogen sulfide scavengers preferentially react with hydrogen sulfide to form less volatile and/or non-volatile products. Conventional hydrogen sulfide scavengers are very effective in removing hydrogen sulfide, and millions of gallons of such scavengers are used annually in North America.

Nevertheless, the use of hydrogen sulfide scavengers is not without drawbacks. Notably, conventional hydrogen sulfide scavengers produce unwanted products. For example, triazine compounds typically react with hydrogen sulfide to form solid impurities comprising amorphous dithiazine, typically referred to as dithiazine solids. While these solid impurities are sufficiently soluble under certain temperature and pressure conditions (e.g., downhole conditions), solid impurities are insoluble under typical conditions. Precipitation of these solid impurities is thus observed in many oil and gas processing systems in significant amounts. For example, the solid impurities may precipitate in transmission and downstream distribution pipelines and facilities. In some case, the solid impurities may precipitate in sufficient quantities to form blockages in processing equipment, such as piping, vessels, storage and transport tanks, and even wells. Problems associated with the precipitation of solid impurities are well-documents and known to those skilled in the art. When precipitated solids accumulate on the inner surfaces of oil and gas equipment and/or components thereof, specialized cleanout procedures are necessary to ensure proper functioning. In some cases, the accumulation may be so severe that replacement of components is inevitable.

Conventional cleanout operations can be costly, time consuming, and challenging. A typical approach dissolves the solid impurities using hydrogen peroxide and/or peracetic acid, often at elevated temperatures. These chemicals, however, are highly corrosive and often damage the equipment they are meant to clean.

Thus, the need exists for novel methods and chemicals for mitigating the precipitation of solid impurities and/or for cleaning the precipitated solid impurities.

SUMMARY

In some aspects, the present disclosure provides a method of removing a solid impurity, e.g., a sulfur-containing compound optionally present as a part of a sulfur-containing impurity composition, from a surface, the method comprising dissolving the solid impurity with a nitrile compound to preferably form a treated sulfur-containing impurity composition comprising less than 99.5 wt % sulfur-containing compound, based on the total weight of the treated sulfur-containing impurity composition, and optionally wherein the treated dithiazine composition further comprises from 1 ppm to 90 wt % polymerized sulfur-containing compound. In some cases, the nitrile compound has a chemical formula $C_xH_{2x-1}(CN)_3$, wherein x is from 4 to 10. In some cases, the nitrile compound comprises tricyanohexane. In some cases, the nitrile compound has a chemical formula $C_xH_{2x}(CN)_2$, wherein x is from 1 to 6. In some cases, the nitrile compound has a chemical formula $C_xH_{2x+1}CN$, wherein x is from 1 to 6. In some cases, the nitrile compound has a chemical structure:

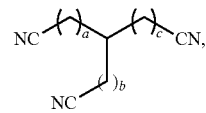

wherein a, b, and c are independently from 0 to 4. In some cases, the solid impurity comprises a dithiazine compound. In some cases, the nitrile compound exhibits dithiazine solubility of from 0.01 kg/l to 20 kg/l at 70° F. In some cases, the nitrile compound exhibits dithiazine solubility of from 0.5 kg/l to 50 kg/l at 125° F.

In some aspects, the present disclosure provides a dissolver solution comprising: a nitrile compound; and a hydrogen sulfide scavenger. In some cases, the dissolver solution comprises the nitrile compound in an amount from 0.1 vol. % to 85 vol. %. In some cases, the nitrile compound has a chemical formula $C_xH_{2x-1}(CN)_3$, wherein x is from 4 to 10. In some cases, the nitrile compound has a chemical structure:

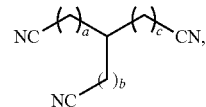

wherein a, b, and c are independently from 0 to 4. In some cases, the nitrile compound comprises tricyanohexane. In some cases, the hydrogen sulfide scavenger comprises a triazine compound. In some cases, the hydrogen sulfide scavenger comprises hexahydro-1,3,5-tris(hydroxyethyl)-s-triazine.

In some aspects, the present disclosure provides a method of dissolving dithiazine, the method comprising adding the dissolver solution of any of the preceding embodiment(s) to a dithiazine-containing system.

In some embodiments, the present disclosure relates to a method of treating a solid sulfur-containing impurity composition comprising a sulfur-containing compound, the method comprising contacting the sulfur-containing compound in the sulfur-containing impurity composition with a nitrile compound to form a treated sulfur-containing impurity composition comprising less than 99.5 wt % sulfur-containing compound and optionally from 1 ppm to 90 wt % trithiane.

In some embodiments, the present disclosure relates to a process for inhibiting the formation of polymeric sulfur-containing compounds in a sulfur-containing impurity composition comprising a sulfur-containing compound, the process comprising adding a nitrile compound to the sulfur-containing impurity composition, wherein at least some of the monomeric sulfur-containing compound in the sulfur-containing impurity composition is dissolved, to form a treated sulfur-containing impurity composition comprising a reduced amount of monomeric sulfur-containing compound; wherein the treated sulfur-containing impurity composition comprises less than 90 wt % polymeric sulfur-containing compound, e.g., trithiane. The reduced amount of monomeric sulfur-containing compound is optionally at least 10% less than the initial amount of sulfur-containing compound present in the sulfur-containing impurity composition.

DETAILED DESCRIPTION

Introduction

As noted above, it has been well-established that conventional hydrogen sulfide scavengers produce impurities due to reactions with hydrogen sulfide. For example, 5-(2-hydroxyethyl)dithiazine is produced when the commonly used hydrogen sulfide scavenger hexahydro-1,3,5,-tris(hydroxyethyl)dithiazine is employed. See, e.g., Jan M. Bakke et al., *Hydrolysis of 1,3,5,-Tris(2-hydroxyethyl)hexahydrodithiazine and Its Reaction with $H_2S$*, 40 IND. ENG. CHEM. RES. 6051 (2001); Grahame N. Taylor & Ron Matherly, *Gas Chromatographic-Mass Spectroscopic Analysis of Chemically Derivatized Hexahydrotriazine-based Hydrogen Sulfide Scavengers: Part II*, 49 IND. ENG. CHEM. RES. 6267 (2010). When formed, impurities may briefly be in the form of a dense liquid layer. Typically, however, the impurities precipitate from solutions as an amorphous solid (e.g., an amorphous (monomeric) dithiazine), which is highly insoluble under the conditions of conventional oil and/or gas operations. It has been discovered that in some cases but not necessarily all, the dithiazine in monomer form may detrimentally polymerize to form additional impurities, e.g., trithiane, which adds difficulty and complexity to overall solid impurity removal. As a result, the solid impurities may buildup on interior surfaces of machinery, causing blockages, clogs, damage, and ultimately failure of the various components.

Furthermore, conventional hydrogen sulfide scavengers, are frequently utilized in industries beyond oil and gas operations. For example, in addition to their use scavenging hydrogen sulfide or other organic sulfide compounds in oil and gas operations, triazine compounds may be implemented in fields such as mining, paper and pulp processing, water power plants, coal fired power plants, and municipal water facilities. It is to be understood that the term "hydrogen sulfide scavengers," as used in the present application, is limited neither to oil and gas operations nor to the intended function of the compound. That is, a hydrogen sulfide scavenger of the present disclosure remains such when it is not expressly used for the purpose of reacting with or otherwise sequestering hydrogen sulfide.

The present disclosure provides compositions and methods for reducing or mitigating the formation and/or buildup of these solid impurities. The solid impurities may be, for example, a sulfur-containing impurity, e.g., a sulfur-containing compound. In some cases, the solid impurity is part of a solid sulfur-containing impurity composition. The sulfur-containing impurity composition comprises the solid impurity, which may be a sulfur-containing compound.

In some embodiments, the present disclosure relates to the use of nitrile compounds in dissolving solid impurities (sulfur-containing impurity compositions) produced by reactions of conventional hydrogen sulfide scavengers, such as triazine compounds, with hydrogen sulfide. The present inventors have found that the nitrile compounds described herein exhibit high solubility for the solid impurities that may form in conventional oil and gas operations. Said another way, the solid impurities readily dissolve (or remain dissolved without precipitating) in (solutions comprising) the nitrile compounds described herein.

The disclosure also relates to a method of treating a (solid) sulfur-containing impurity composition comprising a sulfur-containing compound. The method comprising contacting the sulfur-containing compound in the sulfur-containing impurity composition with the nitrile compound to form a treated sulfur-containing impurity composition, which as a result comprises a reduced amount of the sulfur-containing compound and optionally trithiane, preferably in small amounts.

In some aspects, the present disclosure provides dissolver solutions comprising a nitrile compound and a hydrogen sulfide scavenger. When these dissolver solutions are utilized (e.g., in oil and gas operations), the hydrogen sulfide scavenger preferentially reacts with hydrogen sulfide and produces solid impurities, and the nitrile compound advantageously dissolves solid impurities (e.g., by re-dissolving the precipitated solid impurities and/or by keeping the solid impurities dissolved in solution without precipitating). In other aspects, the present disclosure also provides various methods of using the dissolver solutions and/or nitrile compounds described herein, e.g., to reduce and/or remove hydrogen sulfide, to dissolve dithiazine, and/or to remove a solid impurity.

In some cases, the disclosure relates to a process for inhibiting the formation of polymeric sulfur-containing compounds, e.g., trithiane, in a sulfur-containing impurity composition comprising a sulfur-containing compound. The process adds the nitrile compound to the a sulfur-containing impurity composition to form a treated sulfur-containing impurity composition, wherein at least some of the sulfur-containing compound in the sulfur-containing impurity composition is dissolved. The treated sulfur-containing impurity composition comprises a reduced amount of monomeric sulfur-containing compound and the treated sulfur-containing impurity composition comprises less than 50 wt % polymeric sulfur-containing compound, e.g., trithiane.

In some aspects, the nitrile compound may be used (e.g., standing alone) to dissolve solid impurities. Some nitrile compounds are known and commercially available. However, the disclosed nitrile compounds have been unexpectedly found to be effective for the uses and processes described herein. Conventional teachings have not pointed to the use of the disclosed nitrile compounds for such purposes.

Nitrile Compound

Described herein are a number of nitrile compounds, which the present inventors have found favorably dissolve solid impurities which may be insoluble (e.g., poorly soluble) in conventional solvents. As such, the nitrile compounds are useful in dissolving (e.g., re-dissolving or keeping dissolved) the solid impurities described herein. Furthermore, the nitrile compounds are useful in dissolver solutions comprising the nitrile compound and a hydrogen sulfide scavenger, which reacts (e.g., with hydrogen sulfide) to produce the solid impurity.

The nitrile compound may be any organic compound comprising one or more cyano, or nitrile, functional groups. The inventors have found that the presence of these nitrile compounds may advantageously provide for increased solubility of various solid impurities. For example, the nitrile compounds may preferentially dissolve (e.g., re-dissolve or keep dissolved) solid impurities that precipitate during sweetening processes of oil and gas operations. The presence and/or accumulation of solid precipitates, e.g., on an interior surface of processing equipment, tubulars, vessels, storage tanks, transport tanks, or water disposal wells, may contribute to blockages in machinery, which then require cleaning or replacement. By dissolving the solid impurities, the nitrile compounds mitigate or eliminate the buildup of solid impurities on surfaces. Furthermore, the solubility of the solid impurities in the nitrile compound allows for the use of the nitrile compound (e.g., solutions comprising the nitrile compound) in cleaning the machinery. This disclosure contemplates the use of the nitrile compounds in many such applications (some of which are mentioned above as non-limiting examples) to dissolve solid impurities.

In some embodiments, the nitrile compound is a trinitrile compound, e.g., an organic compound having three cyano, or nitrile, functional groups on a saturated or unsaturated chain of carbon atoms. For example, in some embodiments, the nitrile compound is a trinitrile alkane, e.g., an organic compound having the chemical formula $C_xH_{2x-1}(CN)_3$, wherein x is from 4 to 10. Exemplary trinitrile compounds include butane trinitrile (e.g., tricyanobutane), pentane trinitrile (e.g., tricyanopentane), hexane trinitrile (e.g., tricyanohexane), heptane trinitrile (e.g., tricyanoheptane), octane trinitrile (e.g., tricyanooctane), nonane trinitrile (e.g., tricyanononane), and decane trinitrile (e.g., tricyanodecane), and combinations thereof. In some embodiments the trinitrile compound comprises tricyanohexane, e.g., 1,3,6-tricyanohexane and/or 1,3,5-tricyanohexane.

In terms of chemical structures, the trinitrile compound may have the structure

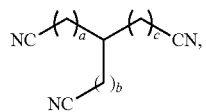

wherein a, b, and c are independently from 0 to 4. In some embodiments, the sum of a, b, and c, is from 3 to 10.

In some embodiments, the nitrile compound is a dinitrile compound, e.g., an organic compound having two cyano, or nitrile, functional groups on a saturated or unsaturated chain of carbon atoms. For example, in some embodiments, the nitrile compound is a dinitrile alkane, e.g., an organic compound having the chemical formula $C_xH_{2x}(CN)_2$, wherein x is from 1 to 6. Exemplary dinitrile compounds include malonitrile (e.g., dicyanomethane), succinonitrile (e.g., dicyanoethane), glutaronitrile (e.g., dicyanopropane), adiponitrile (e.g., dicyanobutane), pentane dinitrile (e.g., dicyanopentane), and hexane dinitrile (e.g., dicyanohexane).

In some embodiments, the nitrile compound is a mononitrile compound, e.g., an organic compound having one cyano, or nitrile, functional groups on a saturated or unsaturated chain of carbon atoms. For example, in some embodiments, the nitrile compound is a nitrile alkane, e.g., an organic compound having the chemical formula $C_xH_{2x+1}(CN)$, wherein x is from 1 to 6. Exemplary nitrile compounds include acetonitrile (e.g., cyanomethane), propionitrile (e.g., cyanoethane), butryronitrile (e.g., cyanopropane), valeronitrile (e.g., cyanobutane), pentane nitrile (e.g., cyanopentane), and hexane nitrile (e.g., cyanohexane).

In some embodiments, the nitrile compound comprises a mixture of the above-noted compounds. For example, a combination of one or more trinitriles, dinitriles, and/or mononitriles may be used. It is contemplated that, in some cases, the nitrile compound may be used without the hydrogen sulfide scavenger (e.g., the dissolver solution may comprise only the nitrile compound), for example to dissolve solid impurities in various applications, including, but not limited to, oil and gas operations, mining, paper and pulp processing, water power plants, coal fired power plants, and municipal water facilities.

When incorporated into the dissolver solution, the content of the nitrile compound present in the dissolver solution is not particularly limited and may vary widely. In one embodiment, the dissolver solution comprises from 0.1 vol. % to 20 vol. % of the nitrile compound, e.g., from 0.1 vol. % 18.5 vol. %, from 0.1 vol. % 17 vol. %, from 0.1 vol. % 15.5 vol. %, from 0.1 vol. % 12 vol. %, from 0.2 vol. % to 20 vol. %, from 0.2 vol. % 18.5 vol. %, from 0.2 vol. % 17 vol. %, from 0.2 vol. % 15.5 vol. %, from 0.2 vol. % 12 vol. %, from 0.5 vol. % to 20 vol. %, from 0.5 vol. % 18.5 vol. %, from 0.5 vol. % 17 vol. %, from 0.5 vol. % 15.5 vol. %, from 0.5 vol. % 12 vol. %, from 0.8 vol. % to 20 vol. %, from 0.8 vol. % 18.5 vol. %, from 0.8 vol. % 17 vol. %, from 0.8 vol. % 15.5 vol. %, or from 0.8 vol. % 12 vol. %. In terms of lower limits, the dissolver solution may comprise greater than 0.1 vol. % of the nitrile compound, e.g., greater than 0.2 vol. %, greater than 0.5 vol. %, or greater than 0.8 vol. %. In terms of upper limits, the dissolver solution may comprise less than 20 vol. % of the nitrile compound, e.g., less than 18.5 vol. %, less than 17 vol. %, less than 15.5 vol. %, or less than 12 vol. %.

In some cases, the content of the nitrile compound present in the dissolver solution may be relatively high. In one embodiment, for examples, the dissolver solution comprises from 15 vol. % to 85 vol. % of the nitrile compound, e.g., from 15 vol. % to 80 vol. %, from 15 vol. % to 75 vol. %, from 15 vol. % to 70 vol. %, from 15 vol. % to 65 vol. %, from 20 vol. % to 85 vol. %, from 20 vol. % to 80 vol. %, from 20 vol. % to 75 vol. %, from 20 vol. % to 70 vol. %, from 20 vol. % to 65 vol. %, from 25 vol. % to 85 vol. %, from 25 vol. % to 80 vol. %, from 25 vol. % to 75 vol. %, from 25 vol. % to 70 vol. %, from 25 vol. % to 65 vol. %, from 30 vol. % to 85 vol. %, from 30 vol. % to 80 vol. %, from 30 vol. % to 75 vol. %, from 30 vol. % to 70 vol. %, or from 30 vol. % to 65 vol. %. In terms of lower limits, the dissolver solution may comprise greater than 15 vol. % of the nitrile compound, e.g., greater than 20 vol. %, greater than 25 vol. %, or greater than 30 vol. %. In terms of upper limits, the dissolver solution may comprise less than 85 vol. % of the nitrile compound, e.g., less than 80 vol. %, less than 75 vol. %, less than 70 vol. %, or less than 65 vol. %.

Hydrogen Sulfide Scavenger

The dissolver solutions described herein comprise a hydrogen sulfide scavenger along with the nitrile compound. The hydrogen sulfide scavenger may vary widely and many hydrogen sulfide scavengers are known.

The hydrogen sulfide scavenger may be any organic or inorganic compound that selectively reacts with, or otherwise sequesters and/or removes, hydrogen sulfide (or other organic sulfide components) in a fluid stream. Preferably, the hydrogen sulfide scavenger converts the sulfide component to a more inert form by an irreversible reaction.

In some embodiments, the hydrogen sulfide scavenger may comprise an inorganic compound. For example, the hydrogen sulfide scavenger may comprise a metal compound, such as a copper-containing compound (e.g., copper carbonate), an iron-containing compound (e.g., iron oxides), or a zinc-containing compound (e.g., zinc carbonate or zinc oxide), which may react to form insoluble copper sulfides. By way of another example, the hydrogen sulfide scavenger may comprise hydrogen peroxide, which may react to form free sulfur.

In some embodiments, the hydrogen sulfide scavenger may comprise an organic compound. For example, the hydrogen sulfide scavenger may comprise a nitrogen-containing compounds, such as a nitrogen-containing heterocycle. In some embodiments, the hydrogen sulfide scavenger comprises a triazine (e.g., a triazine derivative). Said another way, the hydrogen sulfide scavenger may be a triazine compound. Exemplary triazine compounds include triazine (e.g., s-triazine), hexahydro-triazine (e.g., hexahydro-s-triazine), hexahydro-1,3,5-tris(methyl)-s-triazine, hexahydro-1,3,5-tris(ethyl)-s-triazine, hexahydro-1,3,5-tris(propyl)-s-triazine, hexahydro-1,3,5-tris(butyl)-s-triazine, hexahydro-1,3,5-tris(butyl)-s-triazine, hexahydro-1,3,5-tris(hydroxymethyl)-s-triazine, hexahydro-1,3,5-tris(hydroxyethyl)-s-triazine, hexahydro-1,3,5-tris(hydroxypropyl)-s-triazine, hexahydro-1,3,5-tris(hydroxybutyl)-s-triazine, hexahydro-1,3,5-tris(hydroxypentyl)-s-triazine, and combinations thereof.

In terms of chemical structures, the hydrogen sulfide scavenger may have the structure:

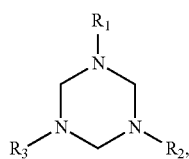

wherein $R_1$, $R_2$, and $R_3$ are independently hydrogen, a $C_1$-$C_5$ alkyl group, a $C_2$-$C_5$ alkenyl group, or a $C_1$-$C_5$ alcohol group. In some embodiments, for example, each of $R_1$, $R_2$, and $R_3$ is a $C_1$-$C_5$ alcohol group, such as a hydroxymethyl group, a hydroxyethyl group, a hydroxypropyl group, a hydroxy butyl group, and/or a hydroxypentyl group.

Commercially available hydrogen sulfide scavengers include PureMark products from Foremark, GasTreat products from Nalco, MEA Traizine products from Hexion, and Sulfix from Baker Hughes.

The content of the hydrogen sulfide scavenger present in the dissolver solution is not particularly limited and may vary widely. In one embodiment, the dissolver solution comprises from 15 vol. % to 85 vol. % of the hydrogen sulfide scavenger, e.g., from 15 vol. % to 80 vol. %, from 15 vol. % to 75 vol. %, from 15 vol. % to 70 vol. %, from 15 vol. % to 65 vol. %, from 20 vol. % to 85 vol. %, from 20 vol. % to 80 vol. %, from 20 vol. % to 75 vol. %, from 20 vol. % to 70 vol. %, from 20 vol. % to 65 vol. %, from 25 vol. % to 85 vol. %, from 25 vol. % to 80 vol. %, from 25 vol. % to 75 vol. %, from 25 vol. % to 70 vol. %, from 25 vol. % to 65 vol. %, from 30 vol. % to 85 vol. %, from 30 vol. % to 80 vol. %, from 30 vol. % to 75 vol. %, from 30 vol. % to 70 vol. %, or from 30 vol. % to 65 vol. %. In terms of lower limits, the dissolver solution may comprise greater than 15 vol. % of the hydrogen sulfide scavenger, e.g., greater than 20 vol. %, greater than 25 vol. %, or greater than 30 vol. %. In terms of upper limits, the dissolver solution may comprise less than 85 vol. % of the hydrogen sulfide scavenger, e.g., less than 80 vol. %, less than 75 vol. %, less than 70 vol. %, or less than 65 vol. %.

Additional Components

The dissolver solutions described herein may comprise further (optional) components in addition to the nitrile compound and the hydrogen sulfide scavenger. These additional components may provide further functionality to the dissolver solution. For example, the additional components may stabilize the dissolver solution or may facilitate the use thereof.

In some embodiments, the nitrile compound and the hydrogen sulfide scavenger are dispersed (e.g., dissolved) in a solvent. In some embodiments, the nitrile compound is used without the presence of a hydrogen sulfide scavenger but is dispersed (e.g., dissolved) in a solvent. Without being bound by any mechanism or theory, the dissolver solutions described herein may comprise any solvent. In some cases, the solvent is an aqueous solvent, such as water. In some cases, the solvent is an organic solvent, such as pentane, hexane, methanol, ethanol, propanol (e.g., n-propanol or isopropanol), acetone, benzene, toluene, xylene. The amount of solvent present in the dissolver solution is not particularly limited. In some cases, the solvent comprises the remainder of the dissolver solution. For example, the dissolver solution may comprise a certain volume percentage of the nitrile compound and the hydrogen sulfide compound (and any additional components) with the remainder being the solvent.

In some embodiments, the dissolver solution further comprises additional components, such as acids, dispersants, viscosifiers, lubricity agents, scale inhibitors, friction reducers, crosslinkers, surfactants, pH adjusters, iron control agents, breakers, or combinations thereof. In some embodiments, the nitrile compound is used without the presence of a hydrogen sulfide scavenger but is mixed with any of these additional components.

In some embodiments, the dissolver solution further comprises a surfactant. In some embodiments, the nitrile compound is used without the presence of a hydrogen sulfide scavenger but is mixed with a surfactant. Surfactants decrease the surface tension of the overall composition and improve the dispersion and solubility of the solid impurities. Examples of suitable surfactants include sorbitan fatty acid ester ethoxylate (e.g., Tween 40), alkylphenol alcohol ethoxylates (e.g., NP-9, NP-4), non-ionic polymeric surfactants (e.g., CRODA Hypermer A70), cationic surfactants (ethoxylated tallow alkylmonium ethosulfate, Crodaquat TES), and sorbitan monooleate (e.g., SPAN 80).

Solid Impurity

As noted above, the reaction of the hydrogen sulfide scavenger, e.g., triazine compounds, with hydrogen sulfide yields solid impurities. And the buildup of these solid impurities on interior surfaces of machinery may cause blockages, clogs, damage, and ultimately failure of the various components in oil and gas operations. Various solid impurities may be formed in various processes where the hydrogen sulfide scavenger is utilized, e.g., oil and gas operations, and the nitrile compounds (alone and/or as a component of the dissolver solution) described herein have advantageously been found to dissolve solid impurities.

In some embodiments, the solid impurities are a product of the reaction of the hydrogen sulfide scavenger with hydrogen sulfide and/or other sulfide components. In some particular embodiments, the solid impurities are products of a triazine-based compound with hydrogen sulfide. In some cases, the solid impurity comprises an organic compound having a six-membered ring with three heteroatoms of nitrogen and/or sulfur. For example, the solid impurity may comprise a thiadiazine compound, a dithiazine compound, or combinations thereof. In terms of chemical structures, the solid impurity may have the structure:

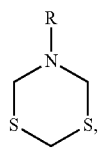

wherein R is hydrogen, a $C_1$-$C_5$ alkyl group, a $C_2$-$C_5$ alkenyl group, or a $C_1$-$C_5$ alcohol group. In some embodiments, for example, R is a $C_1$-$C_5$ alcohol group, such as a hydroxymethyl group, a hydroxyethyl group, a hydroxypropyl group, a hydroxy butyl group, and/or a hydroxypentyl group.

In some embodiments, the hydrogen sulfide scavenger is an azide-based compound having the previously discussed structure, the solid impurity has the above structure, and the R functional group is equivalent to the $R_1$, $R_2$, and/or $R_3$ functional group of azide-based compound. For example, the hydrogen sulfide scavenger may comprise hexahydro-1,3,5-tris(hydroxyethyl)-s-triazine, and the solid impurity may comprise 5-hydroxyethyl-1,3,5-dithiazine.

In some cases, the solid impurity comprises an amorphous dithiazine. For example, the solid impurity may comprise an amorphous product and/or derivative of the dithiazine compound produced from the reaction of the hydrogen sulfide scavenger with hydrogen sulfide and/or other sulfide components. The chemical structure of amorphous dithiazines as well as the mechanism of their formation are described in Grahame N. Taylor & Ron Matherly, *Structural Elucidation of the Solid Byproduct from the Use of 1,3,5,-Tris(2-hydroxyethyl)hexahydro-s-triazine Based Hydrogen Sulfide Scavengers* 50 IND. ENG. CHEM. RES. 735 (2011), which is incorporated herein by reference.

In some embodiments, the solid impurity comprises an inorganic sulfur compound. In some cases, for example, the solid impurity comprises a metal sulfide, such as an iron sulfide (e.g., pyrite), a lead sulfide (e.g., galena), a zinc sulfide (e.g., sphalerite), a silver sulfide (e.g., argentite), a mercury sulfide (e.g., cinnabar), a molybdenum sulfide (e.g., molybdenite), a nickel sulfide (e.g., pentlandite), an arsenic sulfide (e.g., realgar), an antimony sulfide (e.g., stibnite), an iron-copper sulfide (e.g., chalcopyrite), or combinations thereof. In some cases, the solid impurity comprises a sulfate, such as a calcium sulfate (e.g., gypsum, hemihydrate, anhydrite), a strontium sulfate (e.g., celestine), a lead sulfate (e.g., anglesite), a barium sulfate (e.g., barite), or combinations thereof.

In some embodiments, the solid impurity comprises elemental sulfur.

The solid impurities, e.g., dithiazine compounds, are typically insoluble in oil and gas fluids. As a result, the solid impurities precipitate from solution as solids, which may then accumulate on machinery. The present inventors have found, however, that the nitrile compounds (and the dissolver solutions comprising the nitrile compound) exhibit high solubility for the solid impurities. That is, the nitrile compound may re-dissolve precipitated solid impurities and/or retain the solid impurities as solutes (e.g., by reducing or eliminating precipitation). The propensity of the solid impurity (e.g., the dithiazine compound) to dissolve in the nitrile compound can be quantified by the rate of solubility, which indicates a maximum amount of the solid impurity (e.g., dithiazine compound) that will dissolve in the nitrile compound at a given temperature.

As noted above, the aforementioned nitrile compounds have the unexpected ability to dissolve the solid impurities. Stated another way, the solubility of the solid impurity (e.g., a dithiazine compound) in the nitrile compound is surprisingly high. For example, solubility at 70° F. may range from 0.01 kg/l to 20 kg/l, e.g., from 0.01 kg/l to 18 kg/l, from 0.01 kg/l to 16 kg/l, from 0.01 kg/l to 14 kg/l, from 0.01 kg/l to 12 kg/l, from 0.02 kg/l to 20 kg/l, from 0.02 kg/l to 18 kg/l, from 0.02 kg/l to 16 kg/l, from 0.02 kg/l to 14 kg/l, from 0.02 kg/l to 12 kg/l, from 0.04 kg/l to 20 kg/l, from 0.04 kg/l to 18 kg/l, from 0.04 kg/l to 16 kg/l, from 0.04 kg/l to 14 kg/l, from 0.04 kg/l to 12 kg/l, from 0.06 kg/l to 20 kg/l, from 0.06 kg/l to 18 kg/l, from 0.06 kg/l to 16 kg/l, from 0.06 kg/l to 14 kg/l, from 0.06 kg/l to 12 kg/l, from 0.08 kg/l to 20 kg/l, from 0.08 kg/l to 18 kg/l, from 0.08 kg/l to 16 kg/l, from 0.08 kg/l to 14 kg/l, or from 0.08 kg/l to 12 kg/l. In terms of lower limits, the solubility of the solid impurity (e.g., a dithiazine compound) in the nitrile compound at 70° F. may be greater than 0.01 kg/l, e.g., greater than 0.02 kg/l, greater than 0.04 kg/l, greater than 0.06 kg/l, or greater than 0.08 kg/l. In terms of upper limits, the solubility of the solid impurity (e.g., a dithiazine compound) in the nitrile compound at 70° F. may be less than 20 kg/l, e.g., less than 18 kg/l, less than 16 kg/l, less than 14 kg/l, or less than 12 kg/l.

In some embodiments, the solubility of the solid impurity (e.g., a dithiazine compound) in the nitrile compound at 125° F. is from 0.5 kg/l to 50 kg/l, e.g., from 0.5 kg/l to 45 kg/l, from 0.5 kg/l to 40 kg/l, from 0.5 kg/l to 35 kg/l, from 0.6 kg/l to 50 kg/l, from 0.6 kg/l to 45 kg/l, from 0.6 kg/l to 40 kg/l, from 0.6 kg/l to 35 kg/l, from 0.8 kg/l to 50 kg/l, from 0.8 kg/l to 45 kg/l, from 0.8 kg/l to 40 kg/l, from 0.8 kg/l to 35 kg/l, from 1 kg/l to 50 kg/l, from 1 kg/l to 45 kg/l, from 1 kg/l to 40 kg/l, or from 1 kg/l to 35 kg/l. In terms of lower limits, the solubility of the solid impurity (e.g., a dithiazine compound) in the nitrile compound at 125° F. may be greater than 0.5 kg/l, e.g., greater than 0.6 kg/l, greater than 0.8 kg/l, or greater than 1 kg/l. In terms of upper limits, the solubility of the solid impurity (e.g., a dithiazine compound) in the nitrile compound at 125° F. may be less than 50 kg/l, e.g., less than 45 kg/l, less than 40 kg/l, or less than 35 kg/l.

Sulfur-Containing Impurity Compositions

When the solid sulfur-containing compound in the sulfur-containing impurity composition is contacted with the nitrile (and optionally subjected to other treatment such as temperature), a treated sulfur-containing impurity composition is formed.

The sulfur-containing impurity compositions may comprise (monomeric) sulfur-containing compound, e.g., dithiazine. For example, the sulfur-containing impurity compositions may comprise greater than 25 wt % sulfur-containing compound based on the total weight of the sulfur-containing impurity compositions, e.g., greater than 35 wt %, greater than 50 wt %, greater than 75 wt %, greater than 85 wt %, greater than 90 wt %, greater than 95 wt %, or greater than 99 wt %. In terms of ranges, the sulfur-containing impurity compositions may comprise from 25 wt % to 100 wt % sulfur-containing compound, e.g., from 50 wt % to 100 wt %, from 25 wt % to 75 wt %, from 35 wt % to 65 wt %, from 75 wt % to 100 wt %, from 85 wt % to 99.5 wt %, or from 90 wt % to 99 wt %. In terms upper limits, the sulfur-containing impurity compositions may comprise less than 100% sulfur-containing compound, e.g., less than 95 wt %, less than 90 wt %, less than 75 wt %, less than 50 wt %, or less than 35 wt %.

The treated sulfur-containing impurity compositions may comprise reduced amounts sulfur-containing compound, e.g., monomeric dithiazine (reduced with respect to the initial sulfur-containing impurity compositions). For example, treated the sulfur-containing impurity compositions may comprise less than 99.5% sulfur-containing compound based on the total weight of the treated sulfur-containing impurity composition, e.g., less than 99 wt %, less than 95 wt %, less than 92 wt %, less than 90 wt %, less than 75 wt %, less than 60 wt %, less than 50 wt %, less than 40 wt %, less than 35 wt %, less than 25 wt %, less than 15 wt %, less than 10 wt %, less than 5 wt %, or less than 1 wt %. In terms of ranges, the treated sulfur-containing impurity compositions may comprise from 0 wt % to 95 wt % sulfur-containing compound, e.g., from 0 wt % to 75 wt %, from 0 wt % to 50 wt %, from 1 wt % to 35 wt %, from 5 wt % to 25 wt %, or from 10 wt % to 20 wt %. In terms lower limits, the sulfur-containing impurity compositions may comprise greater than 0 wt % sulfur-containing compound, e.g., greater than 1 wt %, greater than 5 wt %, greater than 10 wt %, greater than 25 wt %, or greater than 50 wt %.

In some cases, the reduced amount of monomeric sulfur-containing compound is at least 10% less than the initial amount of sulfur-containing compound present in the untreated sulfur-containing impurity composition, e.g., 15% less than, 25% less than, 35% less than, 50% less than, at least 75% less than, or at least 90% less than.

In some embodiments, the monomeric sulfur-containing impurities may polymerize to form the polymeric sulfur-containing impurities. This polymerization, in some cases, may be beneficially retarded or prohibited by treatment with the nitrile compounds disclosed herein. As a result of treatment, the formation of (polymerized) thiazine-containing polymers/compounds, e.g., trithiane impurity, from monomeric dithiazine, is also retarded or eliminated. Thus, the treated sulfur-containing impurity compositions comprise only small amounts of polymerized sulfur-containing compound, e.g., thiazine-containing polymers/compounds.

For example, the treated the sulfur-containing impurity compositions may comprise less than 100% polymerized sulfur-containing compound, e.g., trithiane, e.g., less than 95%, less than 90 wt %, less than 80 wt %, less than 75 wt %, less than 65 wt %, less than 60 wt %, less than 50 wt %, less than 40 wt %, less than 30 wt %, less than 25 wt %, or less than 10 wt %. In terms of ranges, the treated sulfur-containing impurity compositions may comprise from 1 ppb to 90 wt % polymerized sulfur-containing compound, e.g., from 1 ppm to 90 wt %, from 1 wt % to 90 wt %, from 10 wt % to 80 wt %, from 20 wt % to 75 wt %, from 35 wt % to 75 wt %, from 40 wt % to 70 wt %, or from 45 wt % to 70 wt %. In terms upper limits, the sulfur-containing impurity compositions may comprise greater than 1 ppb polymerized sulfur-containing compound, e.g., greater than 10 ppm, greater than 1 wt %, greater than 10 wt %, greater than 15 wt %, greater than 25 wt %, greater than 35 wt %, greater than 45 wt %, greater than 50 wt %, greater than 60 wt %, greater than 65 wt %, or greater than 75 wt %.

Dissolving Solid Impurities

In light of the relatively high solubility of the solid impurity (or impurities) in the nitrile compound, the nitrile compound (and the dissolver solutions containing the nitrile compound) described herein may be beneficially utilized to dissolve (e.g., to re-dissolve or keep dissolved) solid impurities. Thus, several embodiments of the present disclosure provide methods for utilizing the dissolver solutions and/or the nitrile compound.

In some embodiments, the nitrile compound and/or the dissolver solution is used to reduce or remove a sulfide impurity, such as hydrogen sulfide or an organic sulfide compound. In these embodiments, the dissolver solution described herein is added to a sulfide impurity-containing system. The sulfide impurity-containing system may be component or machinery of oil and gas operations, e.g., a component of a sweetening process. The mechanism of adding the dissolver solution to the system is not particularly limited. In some embodiments, the dissolver solution is added to the system by direct injection. For example, the dissolver solution may be sprayed (e.g., with an atomizing quill) or otherwise injected into a fluid stream (e.g., an oil, gas, or fluid mixture) of the sulfide impurity-containing system. In some embodiments, the dissolver solution is added to the system by a contactor, such as a contactor tower. For example, a fluid stream (e.g., an oil, gas, or fluid mixture) of the sulfide impurity-containing may be bubbled or otherwise fed through a contactor tower filled with the dissolver solution. In these embodiments, the hydrogen sulfide scavenger preferentially reacts with the sulfide impurity, and the nitrile compound dissolves (e.g., re-dissolves and/or keeps dissolved) the product of that reaction.

The disclosure also relates to the treating a sulfur-containing composition, which may comprise solid impurities (as part of a sulfur-containing impurity composition), comprising the step of contacting the solid impurities (in the sulfur-containing impurity composition) with the nitrile compound to form a treated sulfur-containing composition, which has the composition as described herein.

In some embodiments, the nitrile compound and/or the dissolver solution is used to dissolve a solid impurity, such as a dithiazine compound. In these embodiments, the dissolver solution described herein is added to an impurity-containing system. The (sulfide) impurity-containing system may be component or machinery of oil and gas operations, e.g., a component of a sweetening process. The impurity, e.g., dithiazine, may, in some cases, be a product of the sweetening process. To remove the solid, e.g., dithiazine, the dissolver solution is introduced to the impurity-containing system. The mechanism of adding the dissolver solution to the system is not particularly limited. In this embodiment, the dissolver solution may be utilized to clean or remove the precipitated dithiazine compound while continuing to scavenge sulfide impurities.

In some embodiments, the nitrile compound and/or the dissolver solution is used to remove a solid impurity, such as a dithiazine compound, from a surface. In these embodiments, the nitrile compound dissolves the solid impurity. The surface to be cleaned is not particularly limited and may be, e.g., a component or machinery of oil and gas operations, e.g., a component of a sweetening process. In some cases, the impurity-containing system may be a component of machinery on which an impurity, e.g., dithiazine compound, has precipitated and/or accumulated. In some embodiments, for example, it may be a component of an oil and/or gas operation, a mining operation, paper and pulp processing, a water power plant, a coal fired power plant, or a municipal water facility. The dithiazine may, in some cases, be a product of the sweetening process. To remove the solid dithiazine, the nitrile compound is introduced to the surface. The mechanism of adding the dissolver solution to the system is not particularly limited. In this embodiment, the nitrile compound alone may be utilized to clean or remove the precipitated dithiazine compound.

As discussed above, the solid impurity is soluble in the nitrile compound at ambient temperatures. Thus, the above methods may comprise utilizing the nitrile compound and/or the dissolver solution at an ambient temperature. In some embodiments, the nitrile compound and/or the dissolver solution is utilized at a temperature from 50° F. to 90° F., e.g., from 50° F. to 85° F., from 50° F. to 80° F., from 50° F. to 75° F., from 55° F. to 90° F., from 55° F. to 85° F., from 55° F. to 80° F., from 55° F. to 75° F., from 60° F. to 90° F., from 60° F. to 85° F., from 60° F. to 80° F., from 60° F. to 75° F., from 65° F. to 90° F., from 65° F. to 85° F., from 65° F. to 80° F., or from 65° F. to 75° F. In terms of lower limits, the nitrile compound and/or the dissolver solution may be utilized at a temperature greater than 50° F., e.g., greater than 55° F., greater than 60° F., or greater than 65° F. In terms of upper limits, the nitrile compound and/or the dissolver solution may be utilized at a temperature less than 90° F., e.g., less than 85° F., less than 80° F., or less than 75° F.

The solubility of the solid impurity in the nitrile compound increases with temperature. Thus, the above methods may further comprise heating the nitrile compound and/or the dissolver solution (and optionally heating the solid impurity or the solution containing it) to an elevated temperature. In some embodiments, the nitrile compound and/or the dissolver solution is heated to a temperature from 90° F. to 400° F., e.g., from 90° F. to 390° F., from 90° F. to 380° F., from 90° F. to 375° F., from 100° F. to 400° F., from 100° F. to 390° F., from 100° F. to 380° F., from 100° F. to 375° F., from 110° F. to 400° F., from 110° F. to 390° F., from 110° F. to 380° F., from 110° F. to 375° F., from 115° F. to 400° F., from 115° F. to 390° F., from 115° F. to 380° F., or from 115° F. to 375° F. In terms of lower limits, the nitrile compound and/or dissolver solution may be heated to a temperature greater than 90° F., e.g., greater than 100° F., greater than 110° F., or greater than 115° F. In terms of upper limits, the nitrile compound and/or dissolver solution may be heated to a temperature less than 400° F., e.g., less than 390° F., less than 380° F., or less than 375° F.

The dissolution of the solid impurity in the nitrile compound may require a prolonged exposure of the solid impurity to the nitrile compound. Thus, the above methods may further comprise allowing the solid impurity (e.g., a dithiazine compound) to dissolve for an extended time. In some embodiments, the solid impurity (e.g., a dithiazine compound) is exposed to the nitrile compound for from 0.5 hours to 48 hours, e.g., from 0.5 hours to 120 hours, from 0.5 hours to 96 hours, from 0.5 hours to 72 hours, from 0.5 hours to 48, from 1 hour to 48 hours, from 1 hour to 120 hours, from 1 hour to 96 hours, from 1 hour to 72 hours, from 1 hour to 48, from 1.5 hours to 48 hours, from 1.5 hours to 120 hours, from 1.5 hours to 96 hours, from 1.5 hours to 72 hours, from 1.5 hours to 48, from 2 hours to 48 hours, from 2 hours to 120 hours, from 2 hours to 96 hours, from 2 hours to 72 hours, or from 2 hours to 48. In terms of lower limits, the solid impurity may be exposed to the nitrile compound for at least 0.5 hours, e.g., at least 1 hour, at least 1.5 hours, or at least two hours. In terms of upper limits, the solid impurity may be exposed to the nitrile compound for less than 48 hours, e.g., less than 120 hours, less than 96 hours, less than 72 hours, or less than 48 hours.

Trithiane Inhibition

In some cases, the dissolving of dithiazine can be employed to retard formation of impurities formed from the dithiazine (dithiazine monomers). Some examples of an impurity formed from dithiazine monomers are thianes, e.g., trithiane.

In some embodiments, the disclosure relates to a process for inhibiting the formation of (polymerized) sulfur-containing compounds such as (polymerized) thiazine-containing polymers/compounds, e.g., trithiane, in a sulfur-containing impurity composition comprising a sulfur-containing compound, e.g., dithiazine. The polymerized sulfur-containing compounds may be polymers that contain or are formed from (monomeric) dithiazine. The process comprises the step of adding the nitrile compound, e.g., tricyanohexane, (optionally in the dissolver solution) to the sulfur-containing impurity composition. In doing so, the nitrile compound, dissolves at least some of the dithiazine in the sulfur-containing impurity composition to form a treated sulfur-containing impurity composition. In some cases, the treated sulfur-containing impurity composition comprises a reduced amount of (monomeric) sulfur-containing compound (dithiazine), or in some cases no monomeric sulfur-containing compound. As a result, the formation of (polymerized) thiazine-containing polymers/compounds, e.g., trithiane impurity, from monomeric dithiazine, is retarded or eliminated. Stated another way, the little or no trithiane is formed because there is little or no monomeric dithiazine present to form it. The amount of trithiane (or other (polymerized) thiazine-containing polymers/compounds) in the treated sulfur-containing impurity composition may be as is discussed herein.

In some cases, the treated sulfur-containing impurity composition comprises less than 100 wt % (polymerized) thiazine-containing polymers/compounds, e.g., trithiane (see discussion above with respect to make-up of the treated sulfur-containing impurity composition).

In some embodiments, any or some of the steps or components disclosed herein may be considered optional. In some cases, any or some of the aforementioned items in this description may expressly excluded, e.g., via claim language. For example claim language may be modified to recite that the composition does not comprise or excludes castor oil.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

EXAMPLES

The present disclosure will be further understood by reference to the following non-limiting examples.

Example 1

A test was run to assess the solubility of the nitrile compound in the hydrogen sulfide scavenger and to thereby determine the composition of the dissolver solution. A solution of 60 vol. % hexahydro-1,3,5-tris(hydroxyethyl)-s-triazine in water was used as the hydrogen sulfide scavenger. Tricyanohexane was used as the nitrile compound.

Five samples, each of 5 mL, were prepared by adding the nitrile compound to the hydrogen sulfide scavenger. Varying amounts of the nitrile compound were added to prepare samples comprising 1 vol. %, 2 vol. %, 3 vol. %, 4 vol. %, and 5 vol. % of the nitrile compound, respectively, with the balance being hydrogen sulfide scavenger. Each sample was shaken until visually homogeneous and allowed to settle and separate. The samples were shaken again after the initial separation to ensure maximum dissolution and were then evaluated for separation.

For each sample, the shaking resulted in an emulsion that was advantageously stable for up to 1 hour before separation was observed. Thus, all samples were highly stable. In particular, the samples comprising 1 vol. % and 2 vol. % of the nitrile compound did not fully separate at any point; rather, small droplets of the nitrile compound merely coalesced at the surface. Thus, the dissolver solutions comprising about 1-2 vol. % were found to be particularly stable and effective. Thus, some nitrile solutions/compositions can be effective at concentrations below 100 vol. %, e.g., less than 75 vol %, less than 50 vol. %, less than 35 vol. %, less than 25 vol. %, less than 15 vol. %, less than 10 vol. %, less than 5 vol. %, or less than 3 vol. %.

Example 2

Tests were run to assess the solubility of a solid impurity in the nitrile compound. Tricyanohexane was used as the nitrile compound. Two samples of a dithiazine compound were used as the solid impurity: a "laboratory sample" was generated by continuously sparging a 40 vol. % solution of hexahydro-1,3,5-tris(hydroxyethyl)-s-triazine with a mixture of hydrogen sulfide and nitrogen gas until a separation occurred, and a "field sample" was a sample of amorphous dithiazine collected from the contactor tower of a sweetener process.

In the first test, the solubility of the laboratory sample in the nitrile compound was evaluated. Samples were prepared by mixing the solid dithiazine from the laboratory sample with the nitrile compound. The samples were heated to 70° F. and 125° F. for 24 hours. After 24 hours, the undissolved solid impurity was recovered, rinsed with cold isopropyl alcohol, air dried, and weighed. The amount of dissolved solid impurity was determined and used to calculate the solubility of the laboratory sample. Results of this test are reported in Table 1.

TABLE 1

Laboratory Sample Test

|  | Ex. 1 | Ex. 2 |
|---|---|---|
| Temperature (° F.) | 70 | 125 |
| Contact Time (hours) | 24 | 24 |
| Nitrile Compound (g) | 25.03 | 25.01 |
| Initial Solid Impurity (g) | 5.13 | 5.16 |
| Final Solid Impurity (g) | 4.84 | 4.24 |
| Amount Dissolved (g) | 0.29 | 0.92 |
| Calculated Solubility (kg/l) | 0.012 | 0.038 |

As the data of Table 1 show, the nitrile compound was surprisingly effective in dissolving the laboratory sample. In particular, at 125° F., calculated solubility was ~0.04 kg/l.

In the second test, the solubility of the field sample in the nitrile compound was evaluated. Samples were prepared by mixing the solid dithiazine from the field sample with the nitrile compound. The samples were heated to 70° F. and 125° F. for 2 hours or 24 hours. After this time, the undissolved solid impurity was recovered, rinsed with cold isopropyl alcohol, air dried, and weighed. The amount of dissolved solid impurity was determined and used to calculate the solubility of the laboratory sample. Results of this test are reported in Table 2.

TABLE 2

Field Sample Test

|  | Example 3 | Example 4 | Example 5 | Example 6 |
|---|---|---|---|---|
| Temperature (° F.) | 70 | 70 | 125 | 125 |
| Contact Time (hours) | 2 | 24 | 2 | 2 |
| Nitrile Compound (g) | 10.02 | 10.01 | 10.7 | 5.08 |
| Initial Solid Impurity (g) | 12.28 | 12.45 | 12.65 | 45.82 |
| Final Solid Impurity (g) | 11.24 | 7.559 | 0 | 1.186 |
| Amount Dissolved (g) | 1.040 | 4.891 | 12.65 | 44.63 |
| Calculated Solubility (kg/l) | 0.107 | 0.506 | >1.30 | 3.92 |

As the data of Table 2 show, the nitrile compound was surprisingly effective in dissolving the field sample at 70° F. Further, Example 3 and Example 4 indicate that after 2 hours at the lower temperature of 70° F., the solid impurity had dissolved significantly, but had not fully dissolved. Interestingly, further exposure of the solid impurity to the nitrile compound, e.g., for 24 hours, showed an even higher rate of dissolution than at 2 hours. This result suggests methods that employ extended contact times can improve the effectiveness of the dissolution even further.

Also, as shown in Table 2, the nitrile compound was surprisingly effective in dissolving the field sample at 125° F. Within the first two hours, the entire amount of the solid impurity in Example 5 had dissolved. As a result, the actual solubility of the solid impurity was greater than calculated solubility because saturation was not reached (as indicated by the ">" in Table 2). In Example 6, however, the entire solid impurity did not dissolve (that is, saturation was reached), and the solubility could therefore be calculated outright. Examples 5-6 demonstrate the unexpected effectiveness of the nitrile compound in dissolving the solid dithiazine impurity.

In a comparative test, alternative solvents were tested to assess the relative solubility of the field sample. Samples were prepared by mixing the solid dithiazine from the field sample with 20 mL of various solvents. The samples were heated to 70° F. for 2 hours or 24 hours. After this time, the undissolved solid impurity was recovered, rinsed with cold isopropyl alcohol, air dried, and weighed. The amount of dissolved solid impurity was determined and used to calculate the solubility of the laboratory sample. Results of this test are reported in Table 3. Tricyanohexane (Samples 3 and 4) are included for comparison.

TABLE 3

Comparative Field Sample Test

|  | Comp. Ex. A | | Comp. Ex. B | | Comp. Ex. C | | Comp. Ex. D | |
|---|---|---|---|---|---|---|---|---|
| Solvent | Methanol | | Ethanol | | Isopropanol | | Ethylene Glycol | |
| Contact Time (hours) | 2 | 24 | 2 | 24 | 2 | 24 | 2 | 24 |
| Initial Solid Impurity (g) | 5.31 | 10.18 | 5.36 | 5.57 | 5.48 | 5.32 | 5.15 | 5.06 |
| Final Solid Impurity (g) | 0.849 | 2.070 | 1.477 | 1.472 | 4.061 | 4.005 | 6.603 | 3.467 |
| Calculated Solubility (kg/l) | 0.2233 | 0.405 | 0.194 | 0.204 | 0.070 | 0.065 | 0 | 0.054 |

|  | Comp. Ex. E | | Comp. Ex. F | | Comp. Ex. G | | Ex. 3/Ex. 4 | |
|---|---|---|---|---|---|---|---|---|
| Solvent | Diethylene Glycol | | Propylene Glycol | | Acetone | | Nitrile Compound | |
| Contact Time (hours) | 2 | 24 | 2 | 24 | 2 | 24 | 2 | 24 |
| Initial Solid Impurity (g) | 5.52 | 5 | 5.02 | 5 | 5.78 | 10 | 12.28 | 12.45 |
| Final Solid Impurity (g) | 6.825 | 3.911 | 5.650 | 2.995 | 1.124 | 2.584 | 11.24 | 7.559 |
| Calculated Solubility (kg/l) | 0 | 0.054 | 0 | 0.100 | 0.232 | 0.370 | 0.107 | 0.506 |

As the data of Table 3 show, the nitrile compound exhibited comparable solubility of the field sample after 2 hours. After 24 hours, however, the nitrile compound exhibited the greatest solubility 0.506 kg/l, which was well over the 0.4 kg/l demonstrated by methanol, which had the best performance of the comparatives. Furthermore, the nitrile compound has a significantly lower flash point than methanol. The nitrile compound is therefore the favorable product to use in dissolving solids where flammability is a concern (e.g., refineries).

Example 3

Tests were run to assess the ability of the dissolver solution to react with a sulfide impurity and to dissolve the product. A dissolver solution was prepared by mixing 20 mL of a 60 vol. % solution of hexahydro-1,3,5-tris(hydroxyethyl)-s-triazine in water with 3.6 mL of a nitrile compound comprising tricyanohexane (Ex. 8). The resultant dissolver solution comprised 15 vol. % of the nitrile compound. A comparative example utilized 20 mL of a 60 vol. % solution of hexahydro-1,3,5-tris(hydroxyethyl)-s-triazine in water without the nitrile compound (Comp. Ex. H).

In each test, the solution was placed in a test container to which a hydrogen sulfide ($H_2S$) gas supply was attached. The gas valve was opened at a set flow rate, and the hydrogen sulfide bubbled through the tested solution. The treatment continued until the hydrogen sulfide was no longer being consumed, as determined by the detection of hydrogen sulfide in the carryover of the sample. At that point, the gas valve was closed, the hydrogen sulfide supply was stopped, and the breakthrough time was recorded. For the dissolver solution, no noticeable separation between the hydrogen sulfide scavenger and the nitrile compound was observed during or after testing. Results of this test are reported in Table 4.

TABLE 4

Scavenger Test

|  | Ex. 7 | Comp. Ex. H |
|---|---|---|
| Breakthrough Time (min) | 59.7 | 61.4 |
| Scavenged Sulfide (mol/gas) | 15.28 | 15.72 |
| Scavenged Sulfide (lb/gal) | 1.48 | 1.181 |
| Solid Formation Scavenged Sulfide (mol/gas) | 25.64 | 25.63 |
| Solid Formation Scavenged Sulfide (lb/gal) | 1.927 | 1.941 |

As the data of Table 4 show, the breakthrough time of the hydrogen sulfide occurred similar times for both tests. This suggests that the nitrile compound does not interfere with the reactions or the effectiveness of the hydrogen sulfide scavenger.

After the above testing was completed, each sample was poured into a vial and allowed to sit at 70° F. for 24 hours. After 24 hours, Comp. Ex. A had become fully opaque, and solids were visible in a thick slurry. After 24 hours, Ex. 7 had become only slightly hazy, and no solids were visible. This suggests that the presence of the nitrile compound minimized and/or retarded the formation of solid impurities.

Embodiments

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a method of removing a solid impurity, e.g., a sulfur-containing compound optionally present as a part of a sulfur-containing impurity composition, from a surface, the method comprising dissolving the solid impurity with a nitrile compound to preferably form a treated sulfur-containing impurity composition comprising less than 99.5 wt % sulfur-containing compound, based on the total weight of the treated sulfur-containing impurity composition, and optionally wherein the treated dithiazine composition further comprises from 1 ppm to 90 wt % polymerized sulfur-containing compound.

Embodiment 2 is the method of any of the preceding embodiment(s), wherein the nitrile compound has a chemical formula $C_xH_{2x-1}(CN)_3$, wherein x is from 4 to 10.

Embodiment 3 is the method of any of the preceding embodiment(s), wherein the nitrile compound comprises tricyanohexane.

Embodiment 4 is the method of any of the preceding embodiment(s), wherein the nitrile compound has a chemical formula $C_xH_{2x}(CN)_2$, wherein x is from 1 to 6.

Embodiment 5 is the method of any of the preceding embodiment(s), wherein the nitrile compound has a chemical formula $C_xH_{2x+1}CN$, wherein x is from 1 to 6.

Embodiment 6 is the method of any of the preceding embodiment(s), wherein the nitrile compound has a chemical structure:

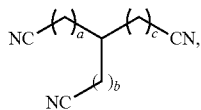

wherein a, b, and c are independently from 0 to 4.

Embodiment 7 is the method of any of the preceding embodiment(s), wherein the solid impurity comprises a dithiazine compound.

Embodiment 8 is the method of any of the preceding embodiment(s), wherein the nitrile compound exhibits dithiazine solubility of from 0.01 kg/l to 20 kg/l at 70° F.

Embodiment 9 is the method of any of the preceding embodiment(s), wherein the nitrile compound exhibits dithiazine solubility of from 0.5 kg/l to 50 kg/l at 125° F.

Embodiment 10 is a dissolver solution comprising: a nitrile compound; and a hydrogen sulfide scavenger.

Embodiment 11 is the dissolver solution of any of the preceding embodiment(s), wherein the dissolver solution comprises the nitrile compound in an amount from 0.1 vol. % to 85 vol. %.

Embodiment 12 is the dissolver solution of any of the preceding embodiment(s), wherein the nitrile compound has a chemical formula $C_xH_{2x-1}(CN)_3$, wherein x is from 4 to 10.

Embodiment 13 is the dissolver solution of any of the preceding embodiment(s), wherein the nitrile compound has a chemical structure:

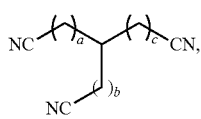

wherein a, b, and c are independently from 0 to 4.

Embodiment 14 is the dissolver solution of any of the preceding embodiment(s), wherein the nitrile compound comprises tricyanohexane.

Embodiment 15 is the dissolver solution of any of the preceding embodiment(s), wherein the hydrogen sulfide scavenger comprises a triazine compound.

Embodiment 16 is the dissolver solution of any of the preceding embodiment(s), wherein the hydrogen sulfide scavenger comprises hexahydro-1,3,5-tris(hydroxyethyl)-s-triazine.

Embodiment 17 is a method of dissolving dithiazine, the method comprising adding the dissolver solution of any of the preceding embodiment(s) to a dithiazine-containing system.

Embodiment 18 is a method of treating a solid sulfur-containing impurity composition comprising a sulfur-containing compound, the method comprising contacting the sulfur-containing compound in the sulfur-containing impurity composition with a nitrile compound to form a treated sulfur-containing impurity composition comprising less than 99.5 wt % sulfur-containing compound.

Embodiment 19 is the method of embodiment 18 wherein the treated sulfur-containing impurity composition comprises from 1 ppm to 90 wt % trithiane.

Embodiment 20 is a process for inhibiting the formation of polymeric sulfur-containing compounds in a sulfur-containing impurity composition comprising a sulfur-containing compound, the process comprising adding a nitrile compound to the sulfur-containing impurity composition, wherein at least some of the monomeric sulfur-containing compound in the sulfur-containing impurity composition is dissolved, to form a treated sulfur-containing impurity composition comprising a reduced amount of monomeric sulfur-containing compound; wherein the treated sulfur-containing impurity composition comprises less than 90 wt % polymeric sulfur-containing compound.

Embodiment 21 is the process of embodiment 20 wherein the reduced amount of monomeric sulfur-containing compound is at least 10% less than the initial amount of sulfur-containing compound present in the sulfur-containing impurity composition.

Embodiment 22 is the process of embodiment 20 or 21 wherein the polymeric sulfur-containing compound comprises trithiane.

We claim:

1. A method of removing from a surface a solid sulfur-containing impurity composition comprising a sulfur-containing compound, the method comprising
   dissolving sulfur-containing compound in the sulfur-containing impurity composition with a dissolver solution comprising a nitrile compound having a chemical formula $C_xH_{2x-1}(CN)_3$, wherein x is from 4 to 10; and a hydrogen sulfide scavenger to form a treated sulfur-containing impurity composition comprising less than 99.5 wt % sulfur-containing compound, based on the total weight of the treated sulfur-containing impurity composition.

2. The method of claim 1, wherein the treated sulfur-containing impurity composition further comprises from 1 ppm to 90 wt % polymerized sulfur-containing compound.

3. The method of claim 1, wherein the nitrile compound comprises tricyanohexane.

4. The method of claim 1, wherein the sulfur-containing compound comprises a dithiazine.

5. The method of claim 1, wherein the nitrile compound exhibits dithiazine solubility of from 0.01 kg/l to 20 kg/l at 70° F.

6. The method of claim 1, wherein the nitrile compound exhibits dithiazine solubility of from 0.5 kg/l to 50 kg/l at 125° F.

7. A dissolver solution comprising:
   a nitrile compound having a chemical formula $C_xH_{2x-1}(CN)_3$, wherein x is from 4 to 10; and
   a hydrogen sulfide scavenger.

8. The dissolver solution of claim 7, wherein the dissolver solution comprises the nitrile compound in an amount from 0.1 vol. % to 85 vol. %.

9. The dissolver solution of claim 7, wherein the nitrile compound comprises tricyanohexane.

10. The dissolver solution of claim 7, wherein the hydrogen sulfide scavenger comprises a triazine compound.

11. The dissolver solution of claim 7, wherein the hydrogen sulfide scavenger comprises hexahydro-1,3,5-tris(hydroxyethyl)-s-triazine.

12. A method of dissolving dithiazine, the method comprising:
adding the dissolver solution of claim 7 to a dithiazine-containing system.

13. A method of treating a solid sulfur-containing impurity composition comprising a sulfur-containing compound, the method comprising contacting the sulfur-containing compound in the sulfur-containing impurity composition with a dissolver solution comprising a nitrile compound having a chemical formula $C_xH_{2x-1}(CN)_3$, wherein x is from 4 to 10; and a hydrogen sulfide scavenger to form a treated sulfur-containing impurity composition comprising less than 99.5 wt % sulfur-containing compound.

14. The method of claim 13, wherein the treated sulfur-containing impurity composition comprises from 1 ppm to 90 wt % trithiane.

15. A process for inhibiting the formation of polymeric sulfur-containing compounds in a sulfur-containing impurity composition comprising a sulfur-containing compound, the process comprising:
adding a a dissolver solution comprising nitrile compound having a chemical formula $C_xH_{2x-1}(CN)_3$, wherein x is from 4 to 10; and a hydrogen sulfide scavenger to the sulfur-containing impurity composition, wherein at least some of the monomeric sulfur-containing compound in the sulfur-containing impurity composition is dissolved, to form a treated sulfur-containing impurity composition comprising a reduced amount of monomeric sulfur-containing compound;
wherein the treated sulfur-containing impurity composition comprises less than 90 wt % polymeric sulfur-containing compound.

16. The process of claim 15, wherein the reduced amount of monomeric sulfur-containing compound is at least 10% less than the initial amount of sulfur-containing compound present in the sulfur-containing impurity composition.

17. The process of claim 15, wherein the polymeric sulfur-containing compound comprises trithiane.

* * * * *